United States Patent [19]
Lowe et al.

[11] Patent Number: 5,787,069
[45] Date of Patent: Jul. 28, 1998

[54] PROTECTIVE COVER FOR AN OPTICAL DISC

[75] Inventors: Michael D. Lowe; Tom A. Borhot; Paule Pijo William Zono Andric; Oliver J. Medic; Warren J. Blatz; Douglas Christian Greening; Stephen Arthur Withington, all of Calgary, Canada

[73] Assignee: Digital Armor Inc., Calgary, Canada

[21] Appl. No.: 713,523

[22] Filed: Sep. 13, 1996

[51] Int. Cl.⁶ .............................. G11B 7/24; G11B 33/14
[52] U.S. Cl. ............................................. 369/291; 369/283
[58] Field of Search ................................ 369/283, 284, 369/289, 290, 291, 292, 275.5; 428/42.1, 66.6, 80, 908.8; 29/229, 235, 243.5, 243.517, 243.518, 270, 271

[56] References Cited

U.S. PATENT DOCUMENTS

| | | | |
|---|---|---|---|
| 3,961,656 | 6/1976 | Aggarwal | 369/291 |
| 4,039,764 | 8/1977 | Bricot et al. | 369/275.5 |
| 4,319,252 | 3/1982 | Drexler | 369/275.1 |
| 4,327,830 | 5/1982 | Patel et al. | 369/292 |
| 4,510,508 | 4/1985 | Janssen | 346/135.1 |
| 4,556,968 | 12/1985 | Pelkey et al. | 369/284 |
| 4,879,710 | 11/1989 | Iijima | 369/291 |
| 4,983,437 | 1/1991 | Merrick | 428/40 |
| 5,020,048 | 5/1991 | Arai et al. | 369/291 |
| 5,299,186 | 3/1994 | Tsurushima | 369/291 |

FOREIGN PATENT DOCUMENTS

| | | | |
|---|---|---|---|
| 551469 | 1/1958 | Canada . | |
| 1171964 | 7/1984 | Canada . | |
| 1193364 | 9/1985 | Canada | 369/291 |
| 1215000 | 12/1986 | Canada . | |
| 2024904 | 3/1991 | Canada . | |
| 2012332 | 9/1991 | Canada . | |
| 2094501 | 4/1992 | Canada . | |
| 2109902 | 5/1994 | Canada . | |
| 599655 | 6/1994 | European Pat. Off. | 369/291 |
| 3427381 | 1/1986 | Germany | 369/290 |
| 8900365 | 9/1990 | Netherlands | 369/291 |
| 711407 | 6/1954 | United Kingdom | 369/291 |
| 2279799 | 1/1995 | United Kingdom | 369/291 |
| 9206904 | 4/1992 | WIPO | 369/291 |
| 9414161 | 6/1994 | WIPO | 369/291 |

*Primary Examiner*—Stuart S. Levy
*Assistant Examiner*—David L. Ometz
*Attorney, Agent, or Firm*—Kane, Dalsimer, Sullivan, Kurucz, Levy, Eisele and Richard, LLP

[57] ABSTRACT

There is provided a new and useful protective cover for an optical disc of circular configuration having a circular aperture centered therein and having an outer edge. The protective cover is a sheet of film of generally circular configuration corresponding to the configuration of the disc, wherein the film is of a material that will not interfere with the read process of the disc when the cover is in place about the disc. The protective cover has a plurality of clasps spaced about a circumferential edge of the film to engage the disc about its outer edge in a snap fit. The invention also relates to a method of applying such a protective cover to such an optical disc comprising the steps of holding the cover with the clasps in a closed position oriented relative to the film toward said disc, expanding the clasps to an open position wider than an outside diameter of the disc, placing the disc within the expanded clasps, concentric with the cover and returning the clasps to the closed position whereby they engage the disc about the outer edge in a snap fit.

11 Claims, 5 Drawing Sheets

# 5,787,069

PROTECTIVE COVER FOR AN OPTICAL DISC

FIELD OF THE INVENTION

This invention relates to a protective cover for an optical disc.

BACKGROUND OF THE INVENTION

The presence of optical discs in entertainment and business applications is ever-increasing in today's high-tech marketplace. Optical discs offer a compact, efficient and cost-effective means of storing data and transmitting that stored data on request. Indeed, optical discs are the fastest growing form of digital data storage in the world today. Such common applications include compact discs (CD's) for music, CD ROM's for computer programs and information retrieval, such as encyclopedias and digital versatile discs (DVD's) for audio-visual entertainment as well as recording purposes.

An optical disc is comprised of a number of discrete layers. The data layer will store the data in the form of a number of microscopic pits to be read by the laser of the optical disc reader. That data layer is enclosed within a series of protective layers, top and bottom. The bottom layers, commonly referred to as the "read-side" of the disc are transparent substrates which allow the laser to pass through to read the data. Scratches to this read-side surface may affect the laser beam path, however, the manner in which data is stored on an optical disc allows for an amount of read-side imperfections without preventing the playing device from reading the disc. Nonetheless, the thickness of the read-side layer of the disc is typically in the order of 1.2 mm and this portion comprises the bulk of a conventional CD, for example.

On the top side of the disc, there is a reflective layer which is in turn protected by a discrete protective layer and a graphical layer, which normally supports the label and information pertaining to the product of the disc. The reflective layer is crucial to the successful use of an optical disc in that it reflects the data enriched laser beam to the playing device receiver where the data is read and interpreted for the user. Any breach or damage to this layer will result in the laser beam passing directly through the disc at the point of the breach or damage, thereby losing the data stored at that point. Notwithstanding the importance of maintaining the integrity of this layer, the combined thickness of the layers which comprise the top-half of a conventional CD is typically in the order of 0.3 mm (one-quarter the thickness of the read-side layers).

There is thus a need in the industry to provide additional protection of the top side of the disc, in addition to the read-side. This protection to both sides of the disc must not interfere with the operation of the disc, yet it should be capable of being user-installed and should be configured so as to completely cover the disc.

Attempts in the prior art thus far have to a large extent relied upon adhesives to secure a plastic film or the like to a CD in order to provide a protective cover. While these covers are effective to prevent scratching or damage to the disc, the adhesive may break down over time and once applied, the cover is not readily removable by the user. Reference is made for example to U.S. Pat. No. 4,983,437 of Merrick, "Compact Disc Protector" which issued Jan. 8, 1991, U.S. Pat. No. 4,879,710 of Iijima, "Optical Disc Protector and Method for Applying Same", which issued Nov. 7, 1989, Canadian Patent No. 1,193,364 granted to Thomson-CSF, which issued Sep. 10, 1985, Canadian Laid-open Patent Application Ser. No. 2,024,904 of Ishikawa et al., which was published Mar. 9, 1991 and Canadian Laid-Open Patent Application Ser. No. 2,109,902, of Lotter, which was published May 28, 1994.

SUMMARY OF THE INVENTION

It is thus an object of the present invention to provide an improved protective cover for optical discs.

In one aspect of the invention there is provided a removable protective cover for use with an optical disc of circular configuration having a circular aperture centred therein and having an outer edge, the protective cover comprising a sheet of film of generally circular configuration corresponding to the configuration of the disc, the film of a material that will not interfere with the read process of the disc when the cover is in place about the disc, and a plurality of clasps spaced about a circumferential edge of the film to engage the disc about its outer edge in a snap fit.

In another aspect of the invention, there is provided a protective cover comprising a further sheet of film of generally circular configuration corresponding to the configuration of the disc, the film of a material that will not interfere with the read process of the disc when the cover is in place about the disc, and a plurality of clasps spaced about a circumferential edge of the film to engage the disc about its outer edge in a snap fit, the sheet to engage the disc on one side in a single-sided embodiment and on opposite faces of the disc in a two-sided embodiment wherein the clasps of one of the oppositely facing sheets are alternating and offset relative to the clasps of the other of the opposite facing sheets about the edge of said disc.

In another aspect of the invention there is provided a method of applying such a protective cover to such an optical disc comprising the steps of holding the cover with the clasps in a closed position oriented relative to the plastic film toward said disc, expanding the clasps to an open position wider than an outside diameter of the disc, placing the disc within the expanded clasps, concentric with the cover and returning the clasps to the closed position whereby they engage the disc about the outer edge in a snap fit.

BRIEF DESCRIPTION OF THE DRAWINGS

These and other advantages of the invention will become apparent upon reading the following detailed description and upon referring to the drawings in which.

Figure 1A:
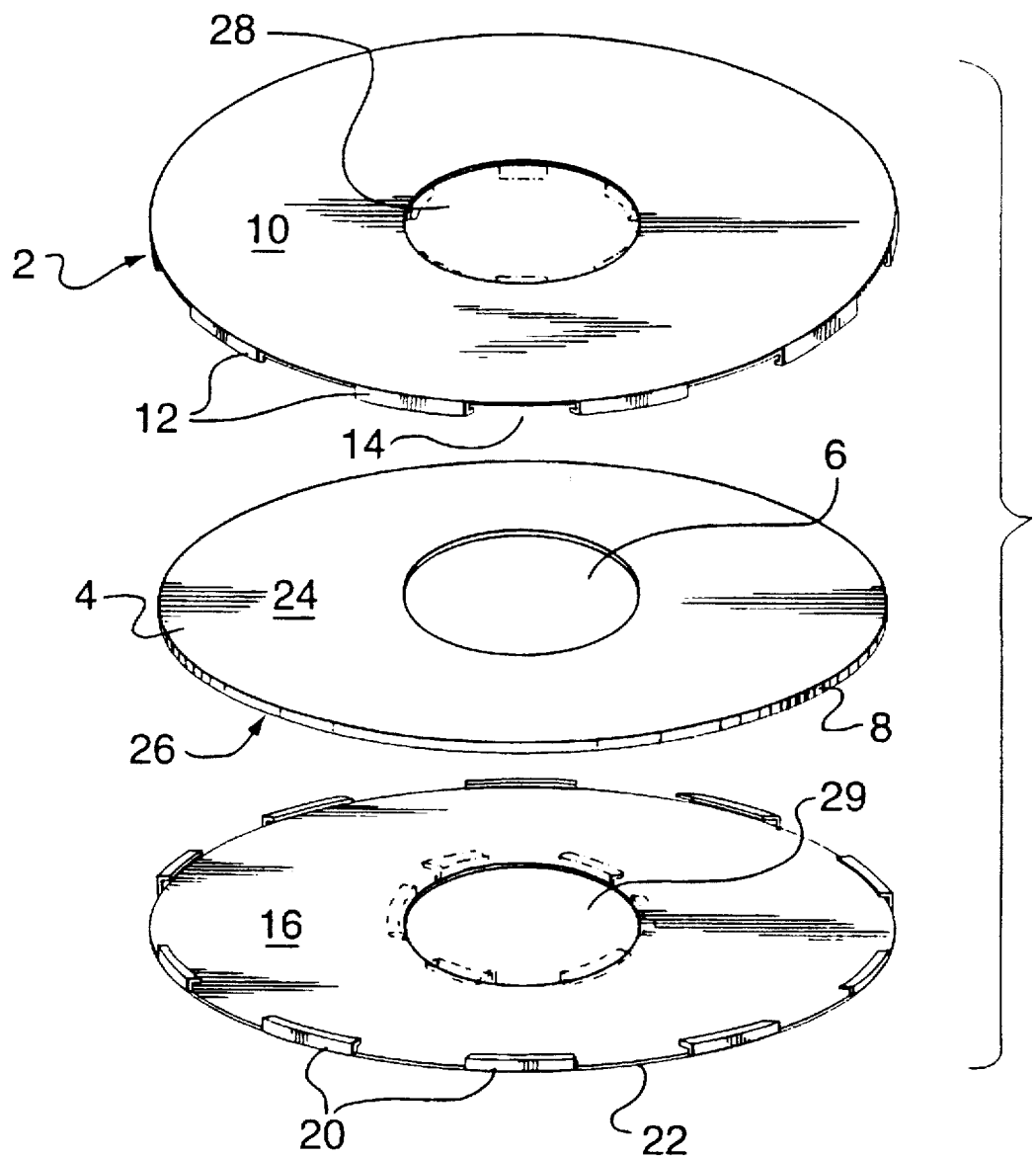
FIGS. 1a and 1b are exploded views of example embodiments of a protective cover and a CD in accordance the invention.

While the invention will be described in conjunction with illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE PREFERRED EMBODIMENTS

In the following description, similar features in the drawings have been given similar reference numerals.

Turning to the drawings, FIG. 1a illustrates a protective cover 2 for use with an optical disc 4 of circular configuration having an aperture 6 centred therein and having an outer edge 8.

The protective cover 2 comprises a sheet of film 10 of generally circular configuration corresponding to the configuration of the disc 4 and of a material that will not interfere with the read process of the disc when the cover 2 is in place about the disc 4. Preferably, the film 10 will be transparent, semi-transparent or opaque. For optimum results, the material of the film should be chosen from plastics having a refractive index comparable to the refractive index of the protective layer of the disc 4 so that there is no interference with the read operation of the disc 4 when the cover 2 is in place. Plastics chosen from the group consisting of polyester and polycarbonate, such as polycarbonate sold under the trade-mark Lexan, are well-suited to the application of the present invention.

Figure 1B:
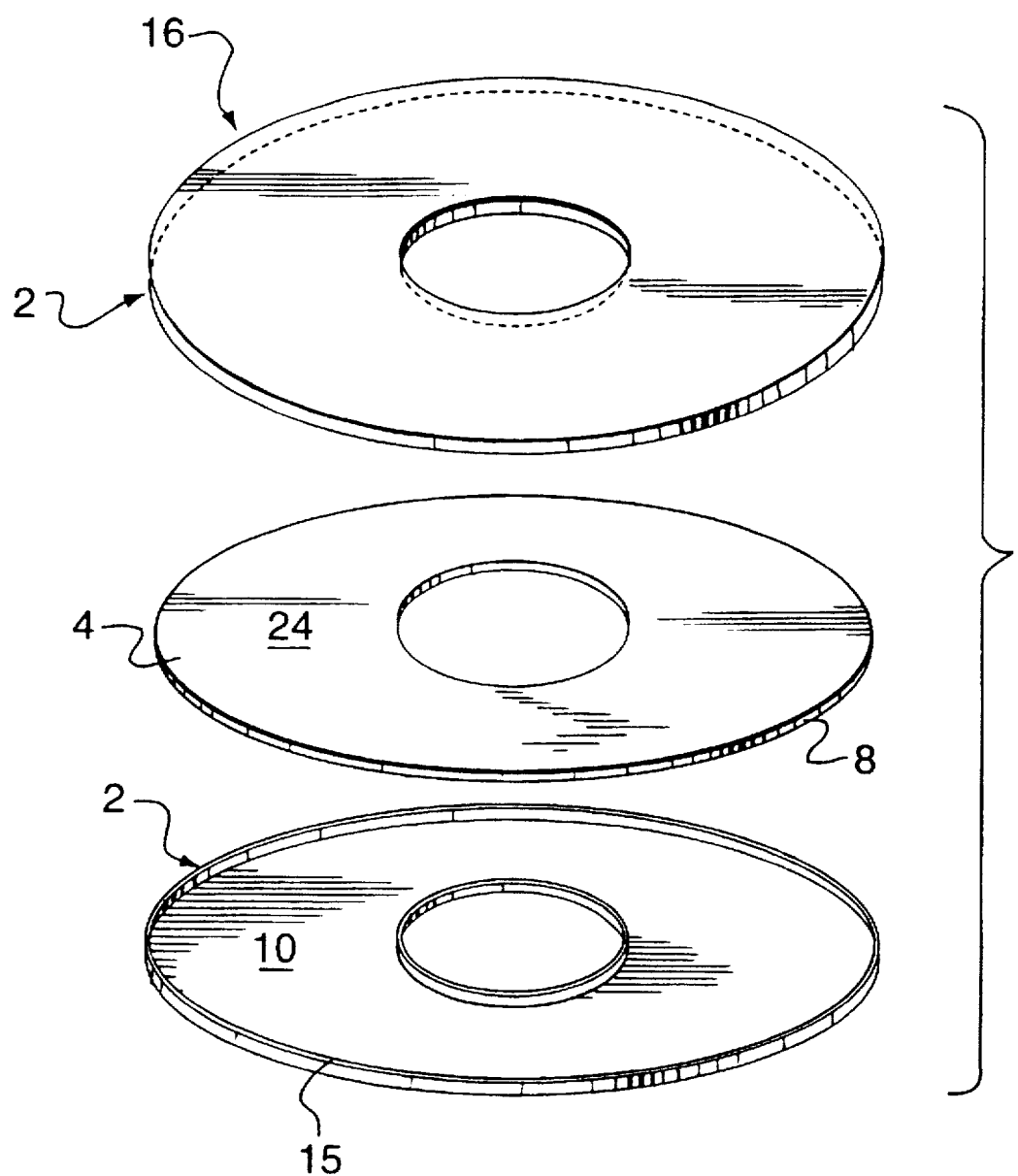

There is also provided a plurality of clasps 12 spaced about a circumferential edge 14 of the film 10 to engage the disc 4 about its outer edge 8 in a snap fit. The clasps 12 could be spaced about an entirety of the circumferential edge 14, or be on only a portion of that circumference. The thickness of the film 10 is typically in the range of 0.001 and 0.02 inches and is preferably about 0.007 inches thick. As seen in FIG. 1b, the cover 2 may have one single continuous clasp 15 about the circumferential edge 14 of film 10, which clasp 15 encompasses the entire outer edge 8 of disc 4 in a single enclosure.

The protective cover 2 may also comprise a further sheet 16 of the film similar to the first sheet 10 and having a plurality of clasps 20 spaced about the circumferential edge 22 of the film 16. In this embodiment, the sheets 10, 16 engage opposite faces 24, 26 respectively of the disc 4, such that the clasps 12 of sheet 10 are alternating and offset relative to the clasps 20 of the second sheet 16 about the outer edge 8 of the disc 4. This thus enables a complete, single layer encasement of the disc 4, both top and bottom, and around the outer edge 8. Where the single continuous clasp 15 is used, as shown in FIG. 1a, the second sheet 16 will not have any clasps and will be of a size and configuration sufficient to cover face 24 of disc 2 and fit within continuous clasp 15 of first sheet 10. This single continuous clasp may be of either the first sheet 10 or second sheet 16 wherein the opposing sheet will not have any clasps.

The sheets 10, 16 are each provided with an aperture 28, 29 respectively centred therein, which aperture is as least as big as aperture 6 in disc 4, such that aperture 28 will not interfere with the function of aperture 6 when the cover 2 is in position around the disc 4. In an alternate design (not shown) the clasps 12 may be positioned about a circumferential edge of aperture 28, 29 to engage an edge of aperture 6 of disc 4 in alternating, offset arrangement.

Figure 2:
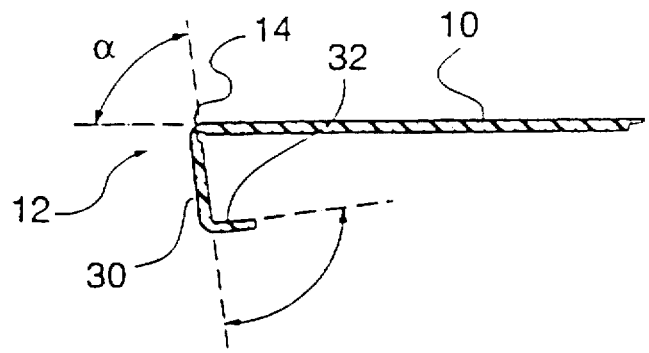
FIG. 2 is a side section view of a clasp of the embodiment of FIG. 1.

As seen in FIG. 2, the clasps 12 comprise a first leg 30 which extends downwardly from the sheet 10 and inwardly at acute angle a and a second leg 32 which extends from an end of leg 30, radially inward relative to the film 10 such that each of the clasps 12 as a whole depends from the circumferential edge 14 in an imperfect "L" configuration. The angle a between the film 10 and the first leg 30 works with the natural resiliency of the film to provide an improved holding force of the cover 2 about the edge 8 of the disc 4; this angle is preferably in the order of 70 to 85 degrees, and preferably 81 degrees. The clasps 20 of the second sheet 16 are similarly oriented.

Figure 3:
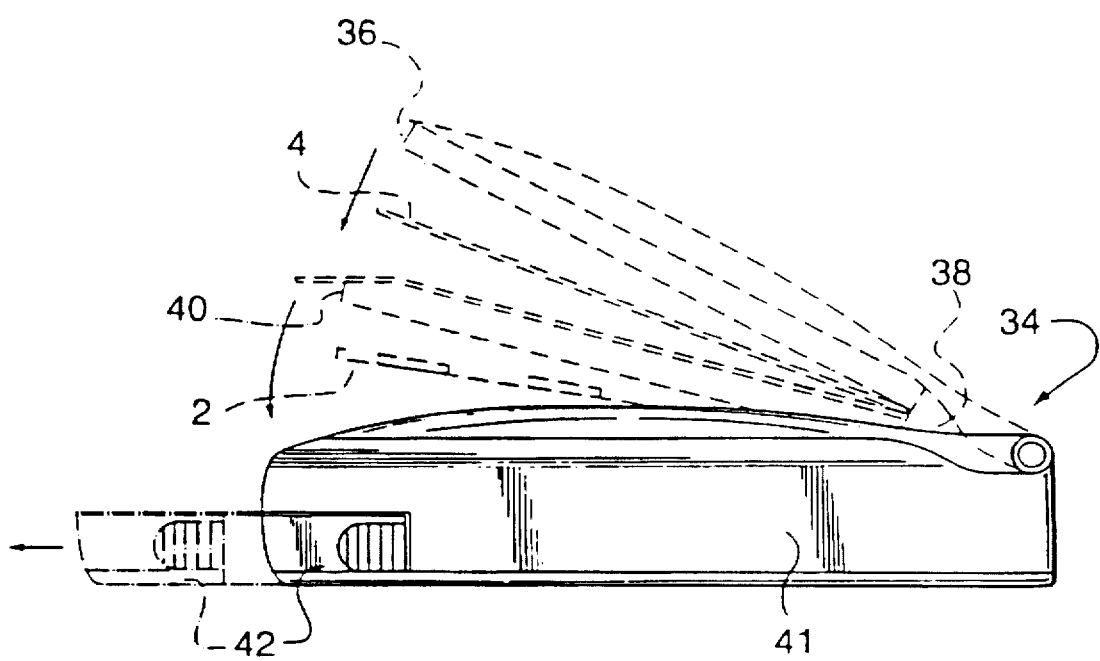
FIG. 3 is a side elevation of an example embodiment of an applicator for applying protective covers in accordance with the present invention.
Figure 4:
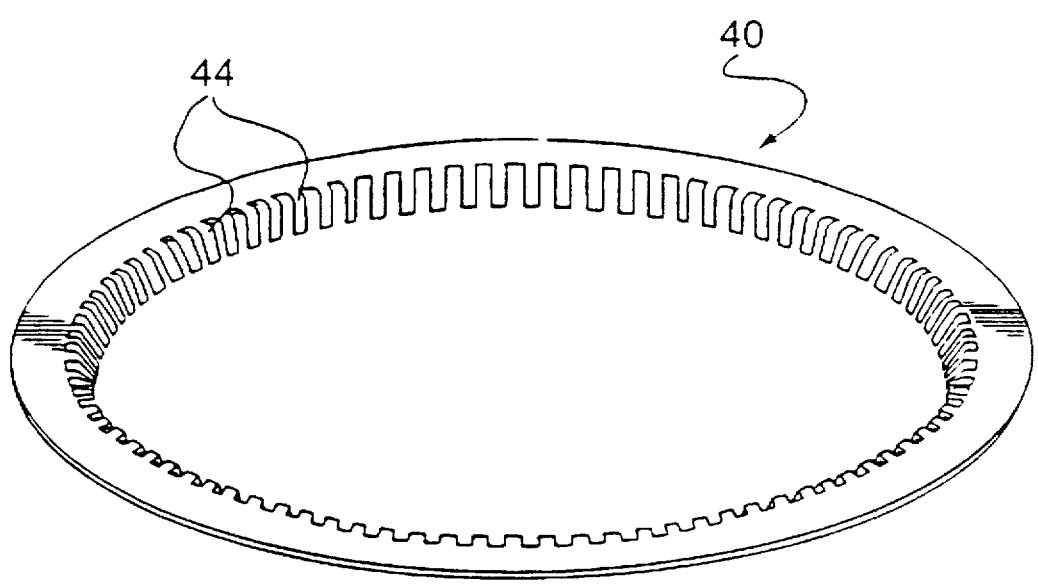
FIG. 4 is a perspective view of an expansion ring used in the applicator of FIG. 3.
Figure 5A:
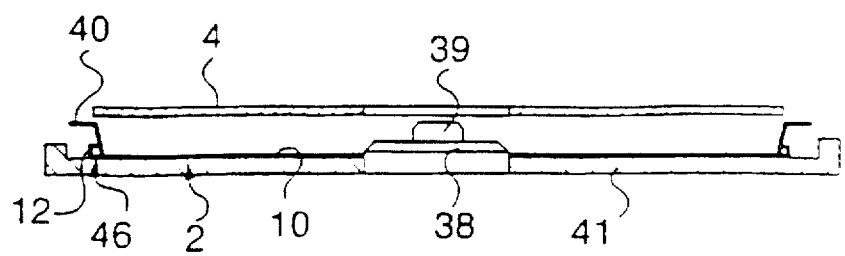
FIGS. 5a, 5b, 5c, 5d and 5e are cross-sectional views of the application method of a protective cover to a CD in accordance with one embodiment of the present invention.
Figure 5B:
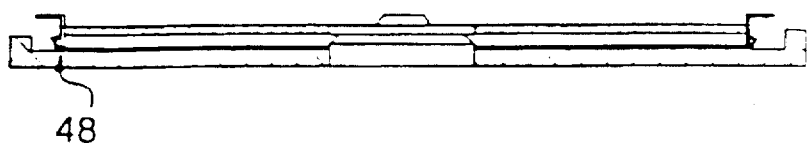
Figure 5C:
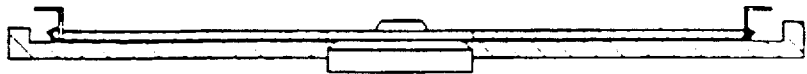
Figure 5D:
Figure 5E:
Figure 6A:
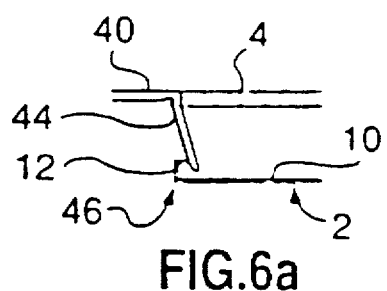
FIGS. 6a, 6b, 6c and 6d are detail views of the cross-sectional views of FIGS. 5a, 5b, 5c, 5d and 5e.
Figure 6B:
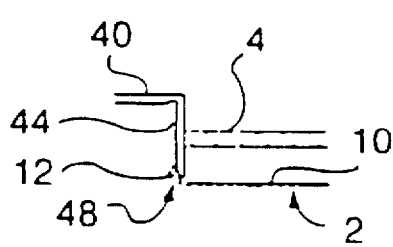
Figure 6C:
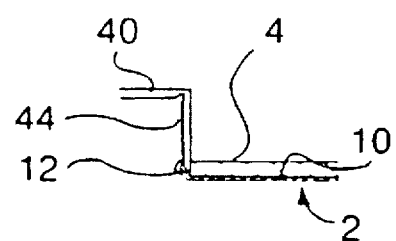
Figure 6D:
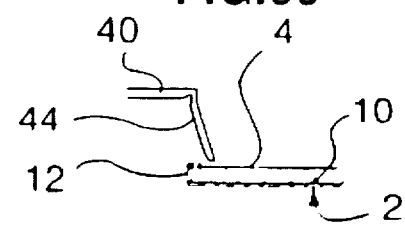

With reference to FIG. 3, there is shown an applicator 34 for use in securing the cover 2 to the disc 4. The applicator 34 comprises a top plate 36 which operates as a press means depressing on the disc 4 within the applicator 34, a first centering pin 38 to hold the cover 2 in place and a smaller second centering pin 39, concentric with the first pin 38, to hold the disc 4 in place, an expanding ring 40, a base 41 and an optional storage tray 42 for holding additional covers. As best seen in FIG. 4, the expanding ring 40 comprises a plurality of resilient fingers 44 which operate on the clasps 12 of cover 2 when in use.

In use, the cover 2 and disc 4 are placed in position on the centering pins 38, 39 within the applicator 34 which will orient the cover 2 and the disc 4 to ensure an accurate fit of the clasps 12 about the edge 8. The disc 4 is inserted inside the perimeter of the expanding ring 40. Referring to the series of drawings in FIGS. 5a to 5e and 6a to 6d, the resilient fingers 44 of the expanding ring 40 meet with the clasps 12 in their closed position 46. The clasps 12 are oriented relative to the film 10 toward the disc 4. As the top plate 36 presses upon the disc 4 in the direction of cover 2, the disc 4 passes through the expanding ring 40 such that the fingers 44 push the clasps 12 into their open position 48. In the open position 48, the diameter of the cover 2 defined by the clasps 12 is greater than the outside diameter of the disc 4 as defined by the outer edge 8. This allows the disc 4 to be pressed down within the cover 2 to lie in contact with the film 10. The expanding ring 40 will then attach itself to the top plate 36 of the applicator 34 by means of a simple catch mechanism (not shown), so that when the applicator 34 is opened, the expanding ring 40 is lifted out of the clasps 12 on the cover 2. The clasps 12 will then "snap" around the edge 8 of disc 4 to hold the cover 2 in place. The disc 4 will thus be firmly positioned within the cover 2. If desired, this process may then be repeated for placing the second sheet 16 on the opposite face 26 of the disc 4 by simply placing another cover 2 in position within the applicator 34 and turning the disc 4 upside down so that the opposite face 26 will come in contact with the second sheet 16. Of course, it will be understood that only a single cover, on either side of the disc, could be used in accordance with the present invention. It will also be understood that the expanding ring 40 can be duplicated in form inside the applicator 41 allowing the clasps to "snap" 2 covers to both sides of the disc at the same time.

Thus, it is apparent that there has been provided in accordance with the invention a protective cover for use with an optical disc that fully satisfies the objects, aims and advantages set forth above. While the invention has been described in conjunction with illustrated embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

The embodiments of the invention in which an exclusive property or privilege is claimed are defined as follows:

1. A removable protective cover for use with an optical disc, said optical disc of circular configuration having a circular aperture centred therein and having an outer edge, said protective cover comprising:

a first sheet of film of generally circular configuration corresponding to the circular configuration of said disc and of a material that will not interfere with the read process of said disc when said cover is in place about said disc;

a second sheet of film of generally circular configuration corresponding to the circular configuration and size of said disc, said second sheet of film of a material that will not interfere with the read process of said disc when in place about said disc;

a plurality of resilient clasps spaced about a circumferential edge of said first and second sheets of film to engage said disc about said outer edge in a snap fit, said first and second sheets to engage said disc on opposite faces thereof and wherein said clasps of one of said oppositely facing sheets are alternating and offset relative to said clasps of the other of said opposite facing sheets about said edge of said disc.

2. The protective cover of claim 1 wherein said first and second sheets of film are transparent.

3. The protective cover of claim 1 wherein said first and second sheets of film are semi-transparent.

4. The protective cover of claim 1 wherein said first and second sheets of film are plastic.

5. The protective cover of claim 1 wherein said each of said first and second sheets of film includes a generally circular aperture concentric with and at least as big as said aperture in said disc.

6. The protective cover of claim 1 wherein said first and second sheets of film have a refractive index that does not affect the read operation of said disc.

7. The protective cover of claim 1 wherein each of said clasps of the respective first and second sheets of film depends from said respective circumferential edge in an L-configuration.

8. The protective cover of claim 1 wherein the thickness of each of said first and second sheets of film is in the range of 0.001 inches and 0.02 inches.

9. The protective cover of claim 8 wherein the thickness of each of said first and second sheets of film is about 0.007 inches.

10. A method of applying a protective cover to an optical disc with the use of an applicator means, said optical disc of circular configuration having a circular aperture centred therein and having an outer edge, said cover comprising a sheet of film of generally circular configuration, said film of a material that will not interfere with the read process of said disc when said cover is in place about said disc, and a plurality of resilient clasps oriented on a circumferential edge of said film, comprising the steps of:

holding said cover with said clasps in a closed position oriented relative to said film toward said disc;

expanding said clasps to an open position wider than an outside diameter of said disc;

placing said disc within said expanded clasps, concentric with said cover; and returning said clasps to said closed position whereby said clasps engage said disc about said outer edge in a snap-on, spring-like fit wherein said applicator means comprises a holding means to hold said cover with said clasps oriented relative to said film toward said disc, an expanding ring concentric with said cover and comprising a plurality of resilient fingers, a means to orient and hold said disc concentric with said cover and a press means to exert a force on said disc in the direction of said cover, whereby said force urges said edge of said disc to co-operate with said resilient fingers to expand said clasps into said open position while urging said disc in position within said cover, whereby when said force is released, said resilient fingers return to an initial state and said clasps return to said closed position thereby engaging said edge of said disc in said snap-on spring-like fit.

11. A removable protective cover for use with an optical disc, said optical disc of circular configuration having a circular aperture centred therein with said circular aperture having a peripheral edge, the cover having an outer edge, said cover comprising:

a first sheet of film of generally circular configuration corresponding to the circular configuration of said disc and of a material that will not interfere with the read process of said disc when said cover is in place about said disc; and a plurality of resilient clasps spaced about a peripheral edge of a circular aperture of said first sheet of film to engage said disc about an edge of said circular aperture of said disc;

a second sheet of film of generally circular configuration corresponding to the circular configuration and size of said disc, said second sheet of film of a material that will not interfere with the read process of said disc when in place about said disc and a plurality of clasps spaced about a peripheral edge of a circular aperture of said second sheet to engage said disc about said edge of said circular aperture of said disc, said first and second sheets to engage said disc on opposite faces thereof and wherein said clasps of one of said oppositely facing sheets are alternating and offset relative to said clasps of the other of said opposite facing sheets.

\* \* \* \* \*